US007954700B2

(12) United States Patent (10) Patent No.: US 7,954,700 B2
Stapfer (45) Date of Patent: Jun. 7, 2011

(54) PROCESSING DEVICE FOR VALUE DOCUMENTS

(75) Inventor: Michael Stapfer, Neubiberg (DE)

(73) Assignee: Giesecke & Devrient GmbH, Munich (DE)

( * ) Notice: Subject to any disclaimer, the term of this patent is extended or adjusted under 35 U.S.C. 154(b) by 165 days.

(21) Appl. No.: 12/306,168

(22) PCT Filed: Jun. 21, 2007

(86) PCT No.: PCT/EP2007/005495
§ 371 (c)(1),
(2), (4) Date: Dec. 22, 2008

(87) PCT Pub. No.: WO2007/147608
PCT Pub. Date: Dec. 27, 2007

(65) Prior Publication Data
US 2009/0279771 A1    Nov. 12, 2009

(30) Foreign Application Priority Data
Jun. 22, 2006   (DE) .................. 10 2006 028 632

(51) Int. Cl.
    *G06Q 40/00* (2006.01)
    *G07D 11/00* (2006.01)
    *G07F 19/00* (2006.01)
(52) U.S. Cl. ............. 235/379; 235/486; 705/43; 705/45
(58) Field of Classification Search .................. 235/379, 235/486; 705/39–45
    See application file for complete search history.

(56) References Cited

U.S. PATENT DOCUMENTS

| 4,784,274 A | 11/1988 | Mori et al. |
| 4,928,230 A | 5/1990 | Kawamura et al. |
| 5,234,209 A | 8/1993 | Weigel et al. |
| 5,954,583 A | 9/1999 | Green |
| 6,422,458 B1 | 7/2002 | Katou et al. |
| 6,474,548 B1 * | 11/2002 | Montross et al. ............. 235/379 |
| RE38,147 E * | 6/2003 | Dawson et al. ............... 713/182 |

(Continued)

FOREIGN PATENT DOCUMENTS

DE                3706829 A1      3/1987

(Continued)

OTHER PUBLICATIONS

German Search Report issued in related application DE 10 2006 028 632.4, dated Dec. 18, 2006, 3 pages.

*Primary Examiner* — Thien M. Le
*Assistant Examiner* — Tuyen K Vo
(74) *Attorney, Agent, or Firm* — Bacon & Thomas, PLLC

(57) ABSTRACT

An apparatus for processing documents of value (12) has a checking device (52) for checking at least one property of a document of value (12) in accordance with at least one predetermined criterion with a sensor device (50), a storage-area housing (56) including a securable storage area in which documents of value (12) recognized as authentic are storable, and has a first opening (54; 88) through which the documents of value (12) can be transported from the processing area (28) to the storage area, a transport device (42) for the singled transport of documents of value (12) along a transport path (48) to the checking device (52) and from there to the storage area, and a processing-area cover (32; 128) has a cover element (36; 128) which can be moved between a close position, in which the processing area (28) is covered by the processing-area cover (32; 128), and an open position, in which an operator is enabled to access the transport path (48).

29 Claims, 7 Drawing Sheets

U.S. PATENT DOCUMENTS

| | | |
|---|---|---|
| 6,772,886 B2 | 8/2004 | Werner et al. |
| 6,843,418 B2 * | 1/2005 | Jones et al. ............... 235/462.01 |
| 6,902,105 B2 * | 6/2005 | Koakutsu ....................... 235/379 |
| 6,926,201 B2 * | 8/2005 | Numata ........................ 235/379 |
| 7,748,615 B2 * | 7/2010 | VanKirk et al. ................ 235/379 |
| 2002/0038818 A1 * | 4/2002 | Zingher et al. ................. 235/381 |
| 2003/0116400 A1 | 6/2003 | Saltsov et al. |
| 2005/0077215 A1 | 4/2005 | Nago et al. |
| 2006/0202023 A1 * | 9/2006 | VanKirk et al. ............... 235/379 |

FOREIGN PATENT DOCUMENTS

| | | |
|---|---|---|
| DE | 19958017 A1 | 12/1999 |
| EP | 0 613 107 A1 | 8/1994 |
| EP | 1 008 965 A1 | 6/2000 |
| EP | 1 550 625 A2 | 7/2005 |
| WO | 93/21609 A1 | 10/1993 |
| WO | WO 93/21609 | 10/1993 |
| WO | 2007/147608 A3 | 12/2007 |

* cited by examiner

PROCESSING DEVICE FOR VALUE DOCUMENTS

FIELD OF THE INVENTION

The present invention relates to a processing apparatus for documents of value and in particular such a processing apparatus with a checking device for detecting at least one property of the documents of value and a storage-area housing, comprising and securing against unauthorized access a storage area in which documents of value are storable which were recognized as authentic by the checking device in accordance with the criterion, and having a first opening through which the documents of value are transportable by the checking device into the storage area.

BACKGROUND

Herein and in the following documents of value are understood as sheet-shaped objects, which represent for example a monetary value or an authorization and which should therefore not be producible at will by unauthorized persons. Therefore they have properties which are not easy to reproduce, in particular such properties whose presence indicates authenticity, i.e. production by a correspondingly authorized authority. Some important examples for such documents of value are coupons, vouchers, checks and in particular bank notes.

Processing apparatus of the above-mentioned type are known in principle. Such a processing device can for example serve to enable operating staff, for example cashiers, to deposit bank notes in a security container from which they cannot remove any deposited bank notes. By means of the processing apparatus an operator can for example verify automatically whether a stack of bank notes is authentic, determine the number and denomination of the bank notes and transport bank notes which were recognized as authentic into security containers in the storage area. The security containers can then be removed from the apparatus and transported to a bank by security transport companies. Therein for example the value of the bank notes can be determined automatically and displayed for the operator. In addition the corresponding amount can be credited to the operator or a company employing the operator.

A corresponding apparatus can have an input device for a stack of bank notes, a singler for singling the bank notes in the stack of bank notes, a transport device for transporting the singled bank notes along a transport path, as well as a checking device arranged at the transport path for detecting at least one property of a bank note transported along the transport path. Therein the transport path extends from the input device or the singler to the storage area.

Despite the careful construction of such apparatus, due to the greatly differing mechanical properties of bank notes in circulation, in particular those subject to strong wear, disturbances, in particular also jams, can occur during the transport of the bank notes within the apparatus along the transport path and into or out of the storage area, which prevent the further operation of the apparatus. It is therefore provided that the apparatus can be opened for eliminating disturbances. In order to render manipulations by operators of a storage arranged in the storage area, in particular the unauthorized removal of bank notes, more difficult, such apparatus can be opened only by persons who have a corresponding special authorization. Since an authorized person consequently has to be called upon every disturbance along the transport path and in particular in the area of the storage area, longer periods can possibly occur during which the apparatus cannot be used.

SUMMARY

It is therefore the object of the present invention to provide an apparatus for processing documents of value in which disturbances during the transport of documents of value within the apparatus can be eliminated quickly and easily, without jeopardizing the security of the documents of value.

The object is solved by an apparatus for processing documents of value, in particular bank notes, with a checking device for checking documents of value for at least one property of a document of value in accordance with at least one predetermined criterion, in particular an authenticity criterion, with a sensor device arranged in a processing area for detecting the property, a storage-area housing comprising and securing against unauthorized access a storage area in which documents of value recognized as authentic in accordance with the criterion are storable, and having a first opening through which the documents of value can be transported from the processing area to the storage area, a transport device arranged in the processing area for the single transport of documents of value fed by the apparatus along a transport path from an input device for the single input of documents of value or a singler to the checking device and from there to the storage area, and a processing-area cover having a cover element which can be moved back and forth between a close position, in which the processing area is covered by the processing-area cover, and an open position, in which an operator is enabled to access the transport path from the input device or the singler to the checking device and from there to the storage area.

The apparatus serves to process input documents of value and consequently has the input device for the single input of documents of value and/or the singler for singling documents of value input in the form of a stack. The input device or the singler can for example be known devices.

The checking device serves to check documents of value fed by the transport device. For this purpose it detects the at least one property of the document of value by means of the sensor device and checks whether the document of value fulfils a predetermined criterion for the property. For checking the property in dependence on sensor-device signals generated during the detection of the property the checking device can comprise an evaluation device which uses the signals for checking the criterion. The evaluation device can be allocated exclusively to the checking device and be designed as a digital circuit or in the form of a processor and a memory, in which a program for carrying out the check is stored that is executable by the processor, or can be implemented at least partly by corresponding software modules or program modules for a control device for controlling the apparatus. The property can in particular be a property selected from the group of optical properties, electrical properties, magnetic properties, mechanical properties, acoustic properties or shape properties, for which the sensor device can have a corresponding sensor. The property of the document of value can in particular be an authenticity feature, such as for example used for bank notes. The predetermined criterion to be fulfilled then refers to the at least approximate presence of the property, such as given in an authentic document of value. Of course the checking device can also be designed for checking several properties, in particular the presence of several predetermined security features, which have to be present cumulatively in order to fulfill the criterion.

In dependence on the checking result, the checked documents of value are stored in the storage-area housing comprising the storage area that does not overlap with the processing area. This serves to protect the stored documents of value against unauthorized access. An unauthorized access is understood as such an access in which a person uses simple physical force or manipulation trying to gain access to the storage area, in order to remove documents of value from it. For transport from the processing area to the storage area the first opening is provided. If documents of value are to be fed to the storage area also from other modules of the apparatus, in particular in the processing area, or output to these from the storage area, the storage-area housing can have additional openings corresponding to the first opening. All explanations concerning the first opening are optionally valid also for these additional openings. The storage-area housing can for example be formed of sufficiently stable plates, but it can also comprise parts of other construction components of the apparatus which are for example arranged in the processing area or enclose the latter at least partly.

As transport device any desired devices can be used that are suitable for transporting documents of value present in a singled state. In particular transport device with transport elements that are known per se, such as for example belts actuated by a drive, rolls, driven rollers, diverting elements and/or switches or combinations of these transport elements can be used. The transport path determined by the transport device starts downstream of the input device or the singler up to the storage area or the first opening.

By means of the processing-area cover the transport device and the transport path provided by it can be secured against unintentional interference and disturbances caused thereby. However, the cover element which can be moved back and forth between a close position, in which the processing area is covered by the processing-area cover, and an open position, in which it is possible for an operator to access the processing area, in particular at least partially to parts of the transport device situated therein, allows access to the processing area, in particular for eliminating transport disturbances. An operator can for example gain access to the transport path in order to eliminate disturbances by moving the cover element, for example turning, swiveling or shifting into the open position.

The cover element is particularly preferably arranged and designed in such a way that in the open position of the cover element transport disturbances can be eliminated along the complete transport path from the input device or the singler up to the storage area or the first opening through the opening in the processing-area cover which is opened by moving the cover element.

In this way by moving only one element it can be rendered possible to eliminate transport disturbances very easily and without a long search for the location of the disturbance. Simultaneously documents of value stored in the storage-area housing are protected against removal.

Particularly preferably in the device the processing-area cover has a cover element which is movable exclusively relative to the transport path. This has the advantage that in the case of a transport disturbance only one movable element is available to an operator in order to eliminate the disturbance, so that a highly intuitive elimination of the disturbance is rendered possible without opening several flaps.

In principle the cover element can be implemented independently of the transport device. The cover element can for example in the simplest case be designed as a plate or molded plastic component serving only to cover. However, it is preferred that it also serves as carrier for parts of the checking device and/or the transport device. This has the advantage that a substantially simpler and in particular also more compact construction of the apparatus can be achieved. In particular in the case that the transport device has at least two sections between which the transport path extends, and of which only one is held on the cover element, an operator can access the transport path particularly easily to eliminate a disturbance, since it is uncovered at least partly by moving the cover element. The parts of the transport device held on the cover element can in particular interact with complementary parts of the transport device when the cover element is in the close position.

The cover element can in principle be movable back and forth in any desired fashion between the open position and the close position relative to the apparatus or the processing area. However, if the transport path extends in a plane, i.e. if at least one plane exists in which the projection of the transport path on the plane is essentially straight, it is preferred that the cover element is rotatable or swivelable around and axis essentially parallel to a plane defined by the transport path. Essentially parallel herein means that the axis encloses an angle with the plane which is smaller than 5°. This embodiment on the one hand allows a particularly robust mounting of the cover element and on the other hand a good overview of the transport device, if the cover element is in the open position. If the transport path is straight, the plane can extend through the transport path as desired, the axis is then substantially parallel to the direction of the transport path.

In order to prevent that anybody can gain access to the processing area and in particular to components arranged therein, the apparatus preferably has a cover locking device, by means of which the cover element can be locked in the close position.

In particular in the case that the cover element carries parts of the transport device, an incomplete closing of the cover element can lead to disturbances in the transport of documents of value. It is therefore preferred that the apparatus has a closing device with a drive that is controllable by closing signals, which, upon the activation of the drive by a closing signal, moves the cover element into the close position from a release position lying between the open position and the close position. This further development has the advantage that the cover element can be moved securely and completely out of the release position, from which it can be manually movable to the open position and back, into the close position. In particular in the close position a force can be exerted on the cover element, which for example presses transport rolls held thereon onto complementary parts of the transport device. Therein the closing device can in particular also comprise the cover locking device. It is particularly preferred to design the closing device in such a fashion that it functions as a locking device by means of which the cover element can be locked in the close position.

In principle the transport path for the documents of value to the storage area or the first opening can extend as desired. Preferably in the apparatus one or the transport path extends from the input device or the singler to the storage area or the first opening, however in an unfolded fashion. An unfolded extension up to the intermediate area therein means that in the case of single feeding from the input device or otherwise from the singler to the intermediate area the transport path extends in a straight line or at least from a virtual perspective, preferably through the cover element, looking down on the transport path does not have any undercuts in a plane spanned by the referenced transport path or by the transport directions defined by it. Therefore the unfolded transport path does not necessarily need to extend in a perfectly straight line, rather also changes in the transport direction can occur, which do not exceed an angle of 20° except for the interfaces to the input device, for example the feed or the singler or the intermediate area. Such a course of the transport path determined by a corresponding design of the transport device offers the advantage that only one suitably dimensioned cover element has to be used, so that a user can access the complete transport path from the input device or the singler up to the first opening simply by moving the one cover element.

It is particularly preferred that downstream of the input device or the singler the transport path extends in an essentially straight line. This has the advantage that transport with a particularly rare occurrence of disturbances can be achieved with only a very small number of components of the transport device.

The apparatus preferably has a control device which detects and stores the at least one property of the documents of value intermediately stored in the intermediate repository which was detected upon checking by the checking device. The stored data can in particular concern the kind and/or the type of documents of value, in the case of bank notes for example their denomination, and can be allocated to the position of the respective documents of value in the intermediate repository. Furthermore the number of intermediately stored documents of value can be stored. For this purpose the control device can in particular comprise a processor and a memory, in which instructions for execution by the processor are stored. The control device can be physically separated from the checking device, however preferably the control device has a processor and a memory which the processor can access and in which instructions are stored for execution by the processor and in particular for checking the criterion as well as detecting and storing the property. Furthermore the instructions can be chosen in such a fashion that during their execution by the processor an allocation of a position of the respective document of value in the intermediate repository in the sequence of the other intermediately stored documents of value to the kind and/or type and/or the value of the document of value is carried out and stored. Furthermore the control device can comprise the access control device, for which purpose the stored instructions can comprise instructions for checking detected access data for the fulfillment of the at least one predetermined access criterion. These embodiments have the advantage that only one processor and one memory have to be provided, representing a substantial constructive simplification.

Preferably at least parts of the apparatus are controlled electrically, for which the control device can also be designed.

It is furthermore preferred that the control device is designed to detect an end of the transport of documents of value to the storage area, and upon detecting an end to determine a cumulative property of the documents of value stored in the storage area, in particular their value. The cumulative property therein is a property which is detected in dependence of at least one property of all documents of value stored in the storage area. Preferably the cumulative property can be stored or output by means of an output device, for example a display device or a printer. It is thus in particular allowed to automatically determine the value of several bank notes, for example a stack of bank notes. For detecting the end of the transport in the storage area, in particular a repository therein, and/or at the transport path at least one sensor, for example a light barrier, can be provided for detecting a transport of a document of value past said sensor.

It cannot be completely ruled out that disturbances occur during the transport of the documents of value in the apparatus. It is therefore preferred that the apparatus has a signal device for indicating the location along the transport path determined by the transport device at least to the storage area in which the occurrence of a transport error was detected. For detecting the disturbance the apparatus can have respective value-document sensors along the transport path, which emit a signal when detecting a document of value in the transport path. By tracking the signals the location of the disturbance can then be determined. It is thus allowed in an advantageous fashion to quickly detect sources of disturbance. For example the signal device can comprise a display device for this purpose, on which the transport path and the location of the disturbance can be displayed at least schematically. Alternatively it can be displayed whether the disturbance occurred in the processing area or in the storage area.

However, it is particularly preferred that the signal device has at least two light sources arranged along the transport path, and that the control device is designed in such a fashion and connected to the signal device that upon detecting the location of a disturbance the light source which is closest to the location of the disturbance is switched to a different or new operating state, in particular switched on. The operating staff is thus enabled to immediately detect the location of a disturbance upon opening the corresponding area.

It is furthermore preferred that on at least one output pocket for outputting documents of value which is freely accessible a removal signal device with at least one light source is arranged that is connected to the control device via a signal connection, and that the control device is designed in such a fashion that the removal signal device is controlled in such a manner that the light source is switched on when documents of value output to the output pocket can be removed from there.

The storage-area housing can in principle be designed as desired. However, it is preferred that the storage-area housing has a storage-area housing element which can be moved back and forth between an open position, in which an operator is enabled to access the storage area via an access area, and a close position, in which it protects the storage area against access by an operator via the access area at least for removing documents of value, and that the apparatus furthermore comprises a locking device for locking the storage-area housing element in the close position. This embodiment does not only have the advantage that stored documents of value or a repository provided in the storage area can be removed easily from the storage-area housing. Rather it is also possible to carry out maintenance works on the repository or to eliminate disturbances in the storage-area housing if the storage-area housing element in the open position grants access to the access area, via which the storage area or the documents of value therein can be accessed. In contrast, in the close position such access is blocked. In order to grant access exclusively for authorized persons the locking device is provided, by means of which the storage-area housing element can be locked in the close position. Preferably therefore only such persons who can activate the locking device have access to the intermediate area at least for removing documents of value therefrom.

This locking device for the storage-area housing, but also a preferably provided locking device for locking the cover element in the close position is preferably designed in such a fashion that it cannot be operated by any random person. Rather, it should be operable only by authorized persons who have corresponding means or data which are accessible preferably exclusively to them. Also here the embodiments described in the following can be used alternatively or cumulatively.

As the simplest variants the locking device of the apparatus can have a lock to be mechanically operated by an operator which can preferably be a security lock. For opening the intermediate-area housing authorized persons are provided with a key to the lock.

In other preferred variants the locking device of the apparatus is electrically and/or pneumatically and/or hydraulically controllable. Therein an electrically controllable locking device is understood also as such a locking device which has an electromagnet for locking. This embodiment has the advantage that the locking device can be controlled by other devices, thereby allowing for a secure check of a person's authorization and an automatic operation in dependence on the check. In particular the locking device can be implemented at least partly by one preferably electric drive of the apparatus serving to open and close the storage-area housing element.

Preferably the apparatus then comprises at least one access-data detection device for detecting access data and at least one access control device connected with the access-data detection device via a signal connection for checking detected access data for the fulfillment of at least one predetermined access criterion and for controlling the locking device in dependence on the check. This variant allows in an advantageous fashion to use a plurality of authentication possibilities. For checking the access criterion of course the detected access data are used, the access criterion can for example contain a certain consistency property of the access data and/or the conformity at least of parts of the access data with predetermined data stored in the apparatus and/or the presence of certain properties of the access data.

In a preferred variant the access-data detection device comprises a reading device for reading access data from a mobile data carrier or data memory, in particular a card reading device for reading chip cards. Therein mobile data carriers or data memories are understood in particular as optical data carriers such as for example CD or DVD or non-volatile memories, for example USB memories or chips on chip cards. The use of such an access-data detection device has the advantage that on the one hand a particularly falsification-proof medium can be used for checking the access authorization and that on the other hand a comparatively great amount of data can be used as access data. The reading device can preferably also be designed as a data writing device, provided that the given type of data carrier or data memory allows writing access. A card reading device is understood in particular as any device by means of which data can be read from preferably flat objects. Therein the data can be given as an optically recognizable pattern for example in the form of character strings or images. Alternatively or cumulatively data can be given in the form of magnetic properties of the card, for example of a magnetic strip, or the shape of the card or parts thereof. Furthermore the card can preferably alternatively or cumulatively have a storage medium, for example a chip, which can be accessed in a contactless or contact-type fashion. For this purpose the card reading device respectively has corresponding sensors, antennas and/or contacts. The data do not all have to be stored in the same fashion, rather it is possible that different portions are stored in different ways. For authentication then in particular data stored on the card can be used, which are used by the access control device after reading out by means of the card reading device.

In another preferred variant the access data comprise biometric data of an operator and the access-data detection device of the apparatus has a device for detecting the biometric data. This embodiment has the advantage that an operator cannot lose or lend out an object or code used for checking the access authorization to the intermediate repository. Theft is not possible either, so that a very great security can be achieved. The device for detecting biometric data can preferably be designed to detect voices, fingerprints, optical features of the iris or of the eye ground, the proportions of body parts or other individual characteristics of the human body or behavior, in order to be able, after detecting the data, to carry out a voice recognition, a fingerprint recognition, an iris or eye ground recognition or recognition of the other characteristics.

These forms of the locking device can be used also in locking the cover element for the processing area, however wherein in operation not all users who are authorized to access the processing area are also authorized to access the intermediate repository.

The storage area can be secured in different ways against access from the processing area. The two preferred possibilities mentioned in the following can be used alternatively or preferably in combination.

According to the first possibility it is however preferred in the apparatus that the first opening has the shape of a slot with a width of less than 9 mm, preferably less than 5 mm. This has the advantage that by a very simple measure access to the storage area through the first opening can be gained at best with a correspondingly thin tool, however for which considerable dexterity and the possession of a suitable tool would be required. The length of the slot is preferably adapted to the greatest dimension of the documents of value transverse to the transport direction directly upstream of the opening.

A second possibility is that at least one element in the storage-area housing or the processing area and/or one element of the storage-area housing can be moved relative to the processing area between a first position, in which documents of value are transportable through the first opening between the storage area and the processing area, and a second position, in which at least in the case that the cover element is disposed in the open position and the storage-area housing element is disposed in the close position, a transport of a document of value out of the storage area through the first opening to the processing area is prevented. This further development allows the complete closing of the first opening and thereby a great security against unauthorized access. Preferably the apparatus then has an actuating drive for moving the at least one element, so that by activating the actuating drive the opening can be automatically closed upon or after moving the cover element to the open position.

The storage area can serve different storage purposes. In a first embodiment of the apparatus the storage-area housing comprises a final storage device for accommodating at least one security container for storing documents of value, which final storage device encloses the storage area at least partially and has the first opening. This embodiment is characterized by a particularly compact construction.

In this embodiment it is furthermore preferred that at least in the case that the cover element is disposed in the open position the first opening is closed to such an extent that a document of value cannot be transported through the first opening. However, at least in the case that the cover element is disposed in the respective close position, a transport is possible between the storage area and the processing area through the first opening. This embodiment has the advantage that even if a tool is used, unauthorized access to the storage area from the processing area can be prevented, which again increases the security of the storage area. To close the first opening any movable element can serve which, upon or after moving the cover element to the open position, can be moved by at least one coupling element mechanically coupled to the cover element or an electrical drive activated by actuating or moving the cover element to the open position. Particularly preferably the cover element can be shaped and arranged in such a fashion that in the open position the cover element closes the first opening at least partially. This further development allows a particularly simple construction of the apparatus.

Furthermore in the embodiment in which the storage area is a final storage area, it is preferred that in the storage-area housing at least one further opening to the storage area is arranged, so that through the openings to the storage area documents of value can be transported into at least two pockets of a predetermined security container with at least two pockets or into at least two predetermined security containers in the storage area. For this purpose in the storage area in particular accommodation devices or retainers or guides for the security container or security containers can be provided, so that these can be arranged easily in a predetermined relative position to the openings. Moreover the security containers and the position of the openings in relation to each other and to the accommodation device or the retainers or guides are adjusted to each other in such a fashion that the openings in the storage-area housing allow a transport into the security container or security containers.

In a different embodiment the storage area represents only an intermediate storage area. More exactly, in an intermediate repository arranged in a storage area representing an intermediate area the apparatus can furthermore comprise an intermediate repository for intermediately storing at least such documents of value whose property fulfills the criterion when checked by the checking device, and a final storage device enclosing the final storage area at least partially for accommodating at least one security container for storing documents of value from the intermediate repository, wherein the storage-area housing represents an intermediate-area housing enclosing the intermediate area and comprising the first opening, through which documents of value coming from the checking device can be fed to the intermediate repository, and a second opening, through which the documents of value are transportable out of the intermediate repository into the final storage area, and in which the storage-area housing element represents an intermediate-area housing element which can be moved back and forth between an open position, in which it is possible for an operator to access the intermediate repository via an access area, and a close position, in which the intermediate area is protected against access by an operator via the access area at least for removing documents of value. Therein the apparatus is furthermore designed in such a way that the intermediate repository is protected against access by an operator at least for removing a document of value stored therein through the first opening when the intermediate-area housing element is disposed in the close position.

Using an intermediate repository is advantageous particularly in the case in which discrepancies occur between the value of the bank notes detected upon deposit and the value of the bank notes given in the opinion of the operator. The operator can then abort the deposit procedure, i.e. prevent the transport from the intermediate repository to the security container, in order to check the deposit of the bank notes again. After the interruption all bank notes intermediately stored in the intermediate repository can be dispensed to the operator again.

For the transport from the intermediate repository to the final storage area and thereby to at least one security container disposed therein the second opening in the intermediate-area housing is provided. If documents of value are fed to the intermediate repository from other modules of the apparatus in the processing area and/or the final storage area or are output to these by the intermediate repository, the intermediate-area housing can have additional openings corresponding to the first and/or the second opening. All explanations concerning the first opening are optionally valid also for these additional openings.

The intermediate-area housing can for example be formed of sufficiently stable plates, but it can also comprise parts of other construction components of the apparatus which are for example arranged in the processing area and/or final storage area or enclose and/or limit these areas at least partly.

Since the apparatus is furthermore designed in such a fashion that the intermediate repository is protected against access by an operator through the first opening if the intermediate-area housing element is disposed in the close position, on the one hand such operators who are not supposed to have access to the intermediate repository can be enabled to access the processing area and in particular the transport device arranged therein, which is most prone to disturbances. For example persons depositing documents of value can eliminate possibly occurring disturbances in the processing area themselves, without having to open the intermediate-area housing. Therefore in these cases the presence of a specially authorized person is not necessary, so that disturbances can be eliminated quickly and the availability of the apparatus is increased. On the other hand the intermediate repository is protected against unauthorized access, so that the deposit of documents of value can take place with great security. Finally a person who can operate the locking device can eliminate a disturbance in the area of the intermediate repository.

To render access from the processing area to the intermediate storage area more difficult, it can furthermore be provided that the intermediate repository can be moved relative to the processing area between a first position, in which documents of value are transportable through the first opening between the intermediate repository and the processing area, and a second position, in which at least in the case that the cover element is disposed in the open position and the intermediate-area housing element is disposed in the close position, a transport of a document of value out of the intermediate repository through the first opening to the processing area is prevented.

It is then particularly preferred that the apparatus comprises at least one actuating drive for moving the at least one element in the intermediate-area housing or the at least one element of the intermediate housing or the intermediate repository and a position-detection device for detecting a movement of the cover element to the open position and/or the reaching of the open position, and that the control device is designed in such a fashion that in dependence on signals of the position detection device and/or data in the position detection device for detecting a movement the actuating drive is activated in such a fashion that a transport between the intermediate repository and the processing area is possible or not. This embodiment has the advantage that upon or after moving the cover element to the open position a possible access to the intermediate repository from the processing area is automatically blocked. The position detection device can for example comprise a position sensor or movement sensor for the cover element or a device that detects and/or executes and/or stores a command to electrically move the cover element to the open position or stores corresponding position data reproducing the position of the cover element. An example for such a device can be the control device.

To secure access from the intermediate storage area to the final storage area a variety of solutions can be used alternatively or in combination. In a first solution the second opening preferably has the shape of a slot with a width of less than 9 mm, particularly preferably less than 5 mm.

In a second solution at least one further element in the intermediate-area housing, a further element of the intermediate-area housing and/or the intermediate repository can be moved back and forth relative to the final storage area between a first position, in which documents of value are transportable through the second opening out of the intermediate repository into the final storage area, and a second position, in which this is not possible. Particularly preferably for this purpose of outputting documents of value the apparatus has an actuating drive for moving the further element in the intermediate-area housing and/or the intermediate-area housing and/or the intermediate repository, and the control device is designed to activate the actuating drive in such a fashion that documents of value stored in the intermediate repository are transportable through one of the openings to the final storage area in dependence on the filling level in the security container and/or in dependence on data input in the control device and/or corresponding to their stored property.

Furthermore it is preferred in the apparatus that in the intermediate-area housing at least one further opening to the final storage area is arranged, so that through the openings to the final storage area documents of value can be transported into at least two pockets of a predetermined security container with at least two pockets or into at least two predetermined security containers in the final storage area. For this purpose in the final storage area in particular accommodation devices or retainers or guides for the security container or security containers can be provided, so that these can be arranged in a predetermined relative position to the openings. Moreover the security containers and the position of the openings in relation to each other and to the accommodation device or the retainers or guides are adjusted to each other in such a fashion that the openings in the intermediate-area housing allow a transport into the security container or security containers. In the case that the apparatus has a diverting device instead of the intermediate repository, the diverting device preferably comprises at least one switch that can be activated by signals, by means of which fed documents of value can be fed to one of the openings to the final storage area in dependence on the signals.

If the apparatus has at least two openings from the intermediate area to the final storage area, it preferably has at least one actuating drive for moving the further element in or on the intermediate-area housing and/or the further element of the intermediate-area housing and/or the intermediate repository, and for outputting documents of value the control device is designed to activate the actuating drive in such a fashion that documents of value stored in the intermediate repository are transportable through one of the openings to the final storage area in dependence on the filling level in the security container and/or in dependence on data input in the control device and/or corresponding to their stored property. Thus in the case of documents of value in the form of bank notes a sorting, for example according to denomination, can already take place in an advantageous fashion inside the apparatus. Also, if two security containers or one security container with two pockets are/is used, it is possible, in dependence on the filling level in at least one of the pockets, to select the opening and thereby the pocket through or into which the following documents of value are to be transported. In particular a change from one of the openings to another of the openings can take place if the corresponding pocket is full. For this purpose the control device preferably has an interface via which signals or data can be received about the filling level in a security container inserted in the apparatus. Alternatively the control device can also detect the number of documents of value output into the security container and select the opening in dependence on this number. Furthermore the data which can be input into the control device via a corresponding input device can for example identify a person or organization to whom the documents of value are to be allocated. The corresponding data can for example be given through the above-described access data.

The embodiment described at the top of the above paragraph generally has the further advantage that a distribution of documents of value to different pockets of a security container or two different security containers can be achieved without a switch in the final storage area. Preferably thus no switch is arranged in the final storage area either. This has the further advantage that the risk of the occurrence of transport disturbances in the final storage area can be reduced substantially. This is particularly favorable since on the one hand operators who can access the processing area and/or the intermediate area frequently cannot access the final storage area and therefore cannot eliminate the disturbance there. On the other hand such operators who have access to the final storage area, for example security transport companies, are rarely present, so that a disturbance in this area could drastically reduce the availability of the apparatus.

If the intermediate repository is movable the actuating drive can be the same in the present embodiment and that described in the preceding paragraph and only has to be activated correspondingly.

The intermediate repository can in principle be designed and accommodated in the apparatus as desired. In a preferred embodiment of the apparatus the intermediate repository can be removed from the apparatus if the intermediate-area housing element is disposed in the open position. It is thus possible to remove the intermediate repository from the apparatus for the duration of an operation interval and to store it in a different safe place without having to remove the documents of value intermediately stored therein beforehand. Moreover in the event of a malfunction of the intermediate repository, in order to eliminate the disturbance the latter can be easily removed and replaced by a different one, so that the availability of the apparatus is not substantially limited.

Preferably in the apparatus the intermediate repository comprises a drum repository and/or a winding repository. A winding repository is understood in particular as a repository that is designed in such a fashion that sheet-shaped documents of value can be accommodated in a singled state between two belts or bands, wherein the belts or bands or corresponding sections thereof are wound on a body when a document of value is accommodated between them. Depending on the type of band a winding repository is partly also referred to as film repository. This use of a winding repository has the advantage that documents of value are intermediately stored in a singled state, so that no singler is required in the intermediate area. Also drum repositories, such as for example described in EP 1 220 167 A1 or EP 0 151 808 A1, or drum repositories with a variable diameter in dependence on a number of documents of value stored therein can be used. Drum repositories can, in dependence on their design, have the advantage that the documents of value inside them can be intermediately stored in an already sorted state, in the case of bank notes for example according to denominations) which can accelerate the output into the security containers.

Particularly preferably the drum repository or winding repository is mounted rotatably or pivotally. An actuating drive provided for the automatic rotation of the winding repository can in particular have a rotary drive or swivel drive for rotating or swiveling the drum repository or winding repository. This has the advantage that an input area and output area of the winding repository, as described above, can be turned to a position in order to block access to the intermediate repository in which access to the input area and output area is not necessary. Furthermore, provided that at least two openings between the intermediate area and the final storage area are used, the intermediate repository or its input and output can be used for selectively feeding the intermediately stored documents of value to one of the openings. Moreover the movement of the winding repository requires very little space, so that a compact construction of the apparatus can be achieved.

The final storage area is enclosed by the final storage device which is preferably designed as a safe, and is connected via said opening of the intermediate-area housing with the intermediate area for transporting documents of value. Therein the final storage device enclosing the final storage area, in particular the safe, and the intermediate-area housing can have a common wall in which the opening is arranged. The final storage device enclosing the final storage area can also have a closing element which is movable between an open position, in which security containers in the final storage area are accessible, and a close position, in which no access is possible to the security container, and which can be locked in the close position by means of a further locking device. For the locking device the same variants come into question as for the locking device for the intermediate-area housing element. This has the advantage that an unauthorized removal of a security container from the final storage device is rendered much more difficult or prevented.

To be able to keep the occurrence of disturbances during the transport of documents of value to a minimum in an advantageous fashion, the apparatus is furthermore preferably designed in such a way that on the transport path of documents of value into the security container or security containers no switch is provided in the final storage area.

According to a further preferred further development in the apparatus an output opening can be provided in the intermediate-area housing, through which documents of value can be output to an output pocket from which they can be removed.

For outputting documents of value from the intermediate repository the intermediate-area housing can in particular also have an output opening toward the processing area, through which the documents of value can be output from the intermediate repository to the processing area or to a pocket of the apparatus that is accessible from the outside.

It can furthermore be preferred that in the apparatus the transport path provided by the transport device has a branch along which documents of value can be transported to the final storage device without intermediate storage in the intermediate repository. This has the advantage that the apparatus can also be used for the quick transport of documents of value into security containers.

If locking devices are used for the closing element and/or the cover element, these can in particular have a common detection device and a common processor and a common memory, in which at least one program is stored that is executable by the processor for controlling the respective locking devices. The processor and the repository then form part of one access control unit. Insofar it is preferred that in an apparatus with controllable locking devices for the intermediate-area housing element and/or the closing element and/or the cover element one single detection unit and one single access control device are provided for controlling the locking mechanisms.

BRIEF DESCRIPTION OF THE DRAWINGS

In the following the invention will be explained by way of example with reference to the drawings. The figures are described as follows.

DETAILED DESCRIPTION

Figure 1:
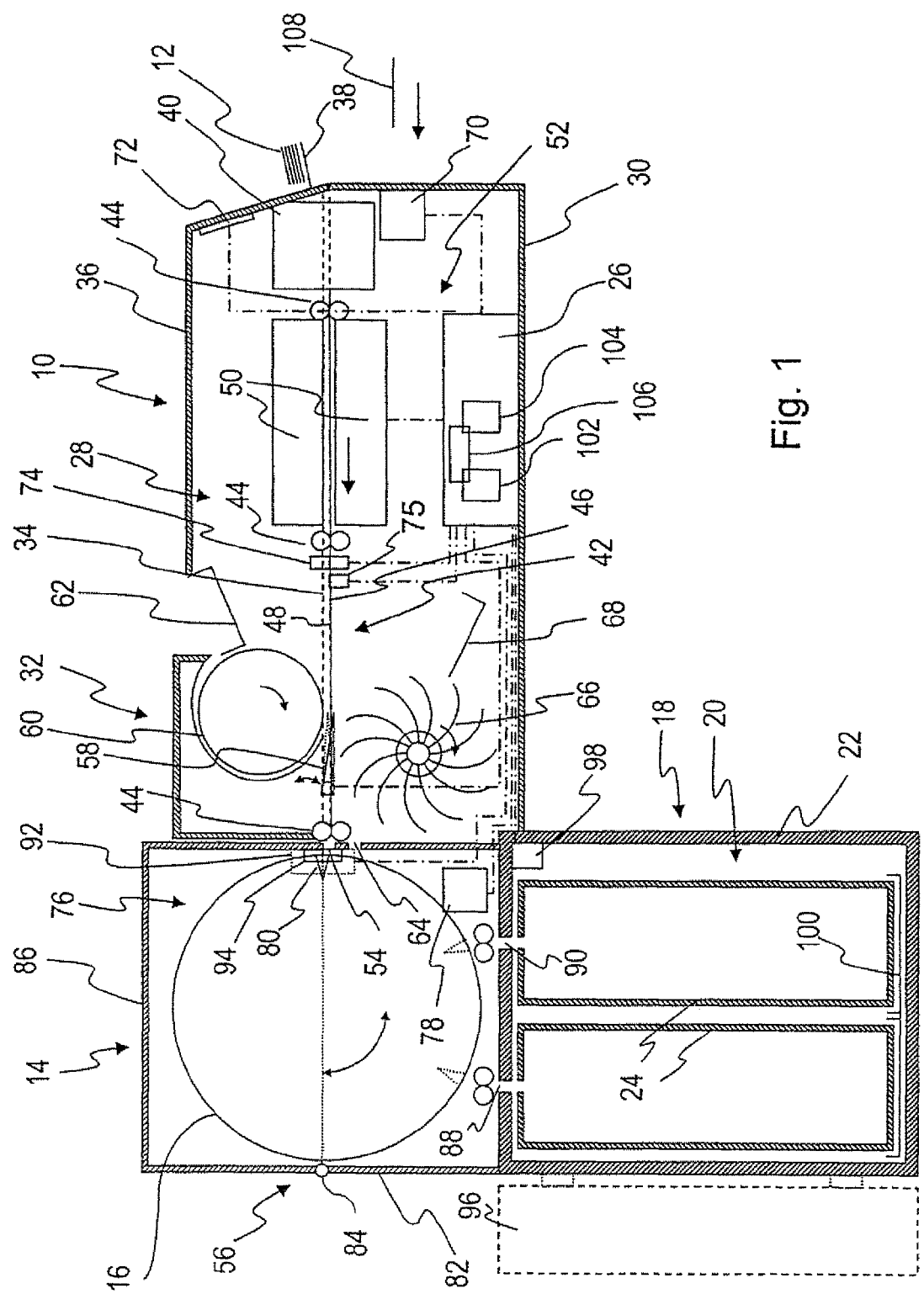
FIG. 1 a schematic lateral view of a bank-note processing apparatus according to a preferred embodiment of the invention in the form of a bank-note deposit apparatus with closed processing-area cover and closed intermediate-area housing, FIG. 2 a schematic lateral view of the bank-note deposit apparatus in FIG. 1 with opened processing-area cover and closed intermediate-area housing, FIG. 3 a schematic lateral view of the bank-note deposit apparatus in FIG. 1 with closed processing-area cover and opened intermediate-area housing, FIG. 4 a schematic lateral view of a bank-note processing apparatus according to a further preferred embodiment of the invention in the form of a bank-note deposit apparatus with closed processing-area cover and closed intermediate-area housing, FIG. 5 a schematic lateral view of a bank-note processing apparatus according to another further preferred embodiment of the invention in the form of a bank-note deposit apparatus with closed processing-area cover and closed intermediate-area housing, FIGS. 6a and b schematic partial representations of a transport device and an intermediate repository with a diverting device of a bank-note processing apparatus according to a further preferred embodiment of the invention, in which the intermediate repository and the diverting device are disposed in respectively different positions, FIG. 7 a schematic lateral view of a bank-note deposit apparatus, in which instead of an intermediate repository a diverting device with a switch is provided, and FIG. 8 a schematic partial sectional view of the bank-note deposit apparatus in FIG. 1, in which a cover element is in a release position.

A processing apparatus for documents of value according to a preferred embodiment of the invention in FIG. 1 in the form of a bank-note processing apparatus comprises a processing section 10 for inputting documents of value, in the example bank notes 12, in a singled state or in the form of a stack, for processing the documents of value 12 and for outputting processed documents of value in dependence on a result of the processing, an intermediate repository section 14 for intermediately storing processed documents of value in an intermediate repository 16, a safe section 18 with a final storage device enclosing a final storage area 20 in the form of a safe 22 for accommodating security containers 24 in the form of cassettes in the final storage area 20 and a control device 26 for controlling the apparatus, which is physically allocated to the processing section in this example.

Figure 2:
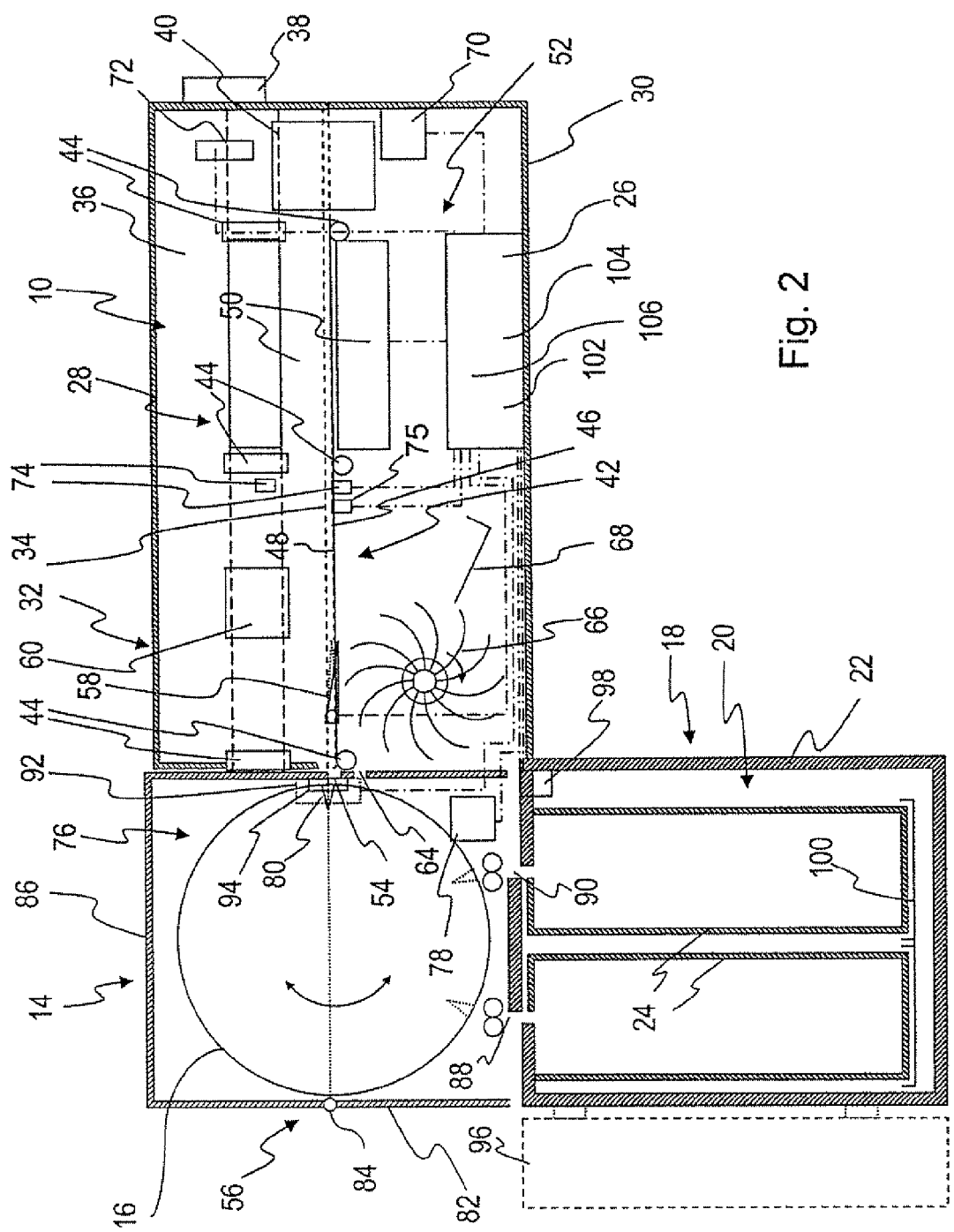

The processing section 10 has a housing enclosing a processing area 28 with a housing base portion 30 and a processing-area cover 32 having a cover element 36 linked via a stable hinge 34 to the housing base portion 30, which cover element can be moved back and forth by swiveling movements between a close position, in which the processing area 28 is covered (cf. FIG. 1), and an open position, in which an operator is enabled to access the processing area 28 (cf. FIG. 2), and which covers the processing area 28 when the cover element 36 is in the close position.

For feeding documents of value 12, in particular in the form of a stack, an input pocket 38 is arranged in or on the cover element 36. Documents of value 12 in the input pocket 38 during operation are singled via a singler 40 of the apparatus in the housing base portion 32. The singled documents of value 12 are then transported by means of a transport device 42, which in the example has, among other things, at least one drive which is not shown in the figures, transport rollers or drive rollers 44 and transport bands or belts 46 guided between and/or around the transport rollers or drive rollers 44, along a transport path 48 from the singler 40 past or through a sensor device 50 of a checking device 52 arranged in the processing area 28 for checking documents of value, here bank notes, up to a first opening 54 in an intermediate-area housing 56.

The checking device 52 serves to check several properties of a document of value or of a bank note according to predetermined partial criteria of an authenticity criterion, and for this purpose has the sensor device 50 connected to the control device 26 via signal connections, which is arranged on both sides of the transport path 48 and, for detecting the properties, has corresponding sensor elements not shown in the figures, which upon detecting the properties generate corresponding sensor signals which are processed in an evaluation device of the control device 26.

Along the transport path 48 downstream of the sensor device 50 a point switch 58 switchable through electrical switch signals is arranged, by means of which, in dependence on the switch signals, documents of value can be fed from the transport path 48 via an output transport device 60 to a first output pocket 62 in the processing area 28, which is accessible via an opening or a slot in the cover element 36.

This results in an essentially straight course of the transport path from the singler 40 to the first opening 54 in the intermediate-area housing 56. In particular the transport path to the first opening 54 determined by the transport device is unfolded, thereby substantially reducing the occurrence risk of transport disturbances in the processing area.

The processing-area cover 32 and in particular its cover element 36 linked to the housing base portion 30 via the hinge 34 are designed and arranged in such a fashion that, when the cover element 36 is disposed in the open position, an operator has access to the complete transport path 48 from the singler 40 up to the first opening 54. Due to the arrangement of the swivel axis of the cover element 36 parallel to a plane determined by the transport path 48 the hinge 34 can hold the cover element 36 in a very stable manner. Moreover the swiveling of the cover element 36 between the open position and the close position requires only little space.

A stacker wheel arrangement 66 arranged in the processing area 28 upstream of an output opening 64 of the intermediate-area housing 56 serves to output singled documents of value to a second output pocket 68.

In the processing area 28 furthermore the control device 26 is arranged, which among other things is connected via signal connections to an access-data detection device 70 in the form of a chip-card reader and a data input and output device 72 in the form of a touch-sensitive display field or touch screen in the cover element 36.

Figure 8:
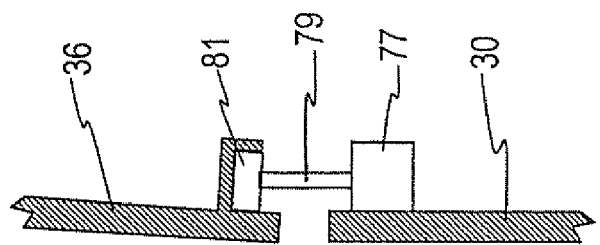

For locking the cover element 36 in the close position in the processing area 28 furthermore a locking device 74 that is connected to the control device 26 via a signal connection and controllable through locking signals is arranged, which in this example also serves as a closing device for moving the cover element 36 from a predetermined release position lying between the open position and the close position to the close position. The locking device has an actuator 77 held on the housing base portion 30, more exactly a stepper motor with a thread shaft 79, more exactly a trapezoidal spindle, and a thread element 81 that is complementary to the thread shaft and is held on or implemented within the cover element 36, in the example a nut fixed to the cover element 36 or an internal thread in the cover element 36 (cf. FIG. 8). In a different embodiment the positions of the actuator 77 with the thread shaft and of the complementary thread element can also be interchanged. The thread shaft protrudes over the edge of the housing base portion 30 to such an extent that the cover element 36 in the release position (cf. FIG. 8) does not rest on the housing base portion 30, i.e. the housing is closed, and the complementary thread element only rests on the thread shaft, so that the cover element 36 can be manually moved to the open position. For moving the cover element 36 to the close position it is first manually moved to the release position, the reaching of which is detected by means of a suitable sensor, for example a light barrier. Upon reaching the release position and receiving corresponding locking signals the actuator 77 turns the thread shaft, so that the threads of the thread shaft 79 and the complementary thread element 81 engage with each other and the cover element 36 is pulled against the housing base portion 30. Upon reaching the close position the actuator 77 is switched off whereby the cover element 36 is locked in the close position. For opening the actuator 77 is operated in the reverse direction, until the cover element has reached the release position. A monitoring device or position detection device, which in this example has a switching element 75 actuated only in the close position, here an interrupt 75 switchable by moving the cover element 36 into the or out of the close position and connected to the control device 26 via a signal connection, serves to monitor the position of the cover element 36, more exactly to monitor whether the cover element 36 is disposed in the close position.

The intermediate storage section 14 comprises the intermediate-area housing 56 enclosing an intermediate area 76, the intermediate repository 16 arranged in the intermediate area 76, in the example a winding repository, which is movable, in the example turnable, relative to the intermediate-area housing 56 by an actuating drive 78 connected to the control device 26 via a signal connection, as well as transport elements—not shown in the figures for the sake of clarity—for transporting documents of value 12 from an input and output opening 80 in the intermediate repository 16 to the processing area 28 or the safe section 18 or from the processing area 28 to the input and output opening 80 of the intermediate repository 16.

Figure 3:
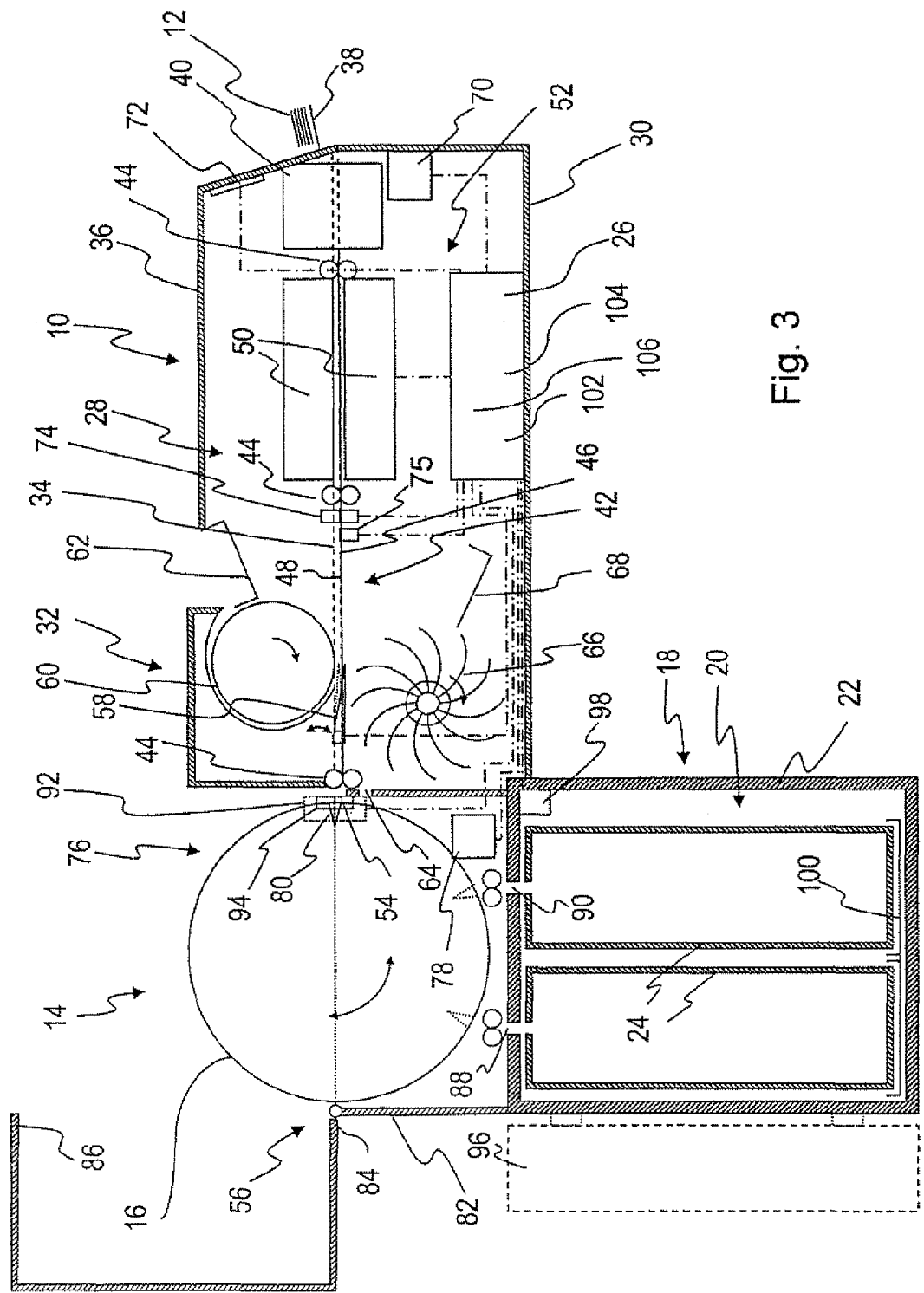

The intermediate-area housing 56 is formed by a section of the safe 22, side walls 82 and an intermediate-area housing element 86 held movably, in particular pivotally, on one of the side walls 82 via a stable hinge 84, which element 86 can be moved back and forth between a close position shown in FIG. 1 and an open position shown in FIG. 3, in which the intermediate repository is accessible via an access area, here the area above the opening of the base portion of the intermediate storage housing, formed by the section of the safe 22 and the side walls 82.

The first opening 54 in the intermediate-area housing 56, through which the documents of value can be transported back and forth between the intermediate area 76 and the processing area 28, is formed by the intermediate-area housing element 86 and one of the side walls 82 disposed opposite.

In the intermediate-area housing 86, more exactly the upper wall of the safe 22, a second opening 88 and a further opening 90 are implemented, through which documents of value are transportable out of the intermediate area 76 to the final storage area 20 enclosed by the safe 22. The width of the slot-shaped openings 88 and 90 is chosen in such a fashion that these allow the automatic transport of documents of value, in the example bank notes, through them, however any manual access from the final storage area 20 to the intermediate repository 16 or from the intermediate area 76 to the final storage area 20 for removing documents of value is impossible or at least impossible without special tools. In the example they have a width of approximately 7 mm.

In the intermediate-area housing 86, more exactly the side wall 82 facing the processing area 28, the output opening 64 is implemented, through which the documents of value are transportable out of the intermediate repository 16 to the stacker-wheel arrangement 66. Like the openings 88 and 90 the width of the slot-shaped output opening 64 is chosen in such a fashion that it allows the automatic transport of documents of value, in the example bank notes, through it, however any manual access from the processing area 28 to the intermediate repository 16 for removing documents of value is impossible or at least impossible without special tools. In the example it also has a width of approximately 7 mm.

In the close position the intermediate-area housing element 86 locks the intermediate-area housing 56 except for the openings 54 and 64 to the processing area and the openings 88 and 90 to the final storage area 20, so that any access by persons to the intermediate area 76 and in particular the intermediate repository 16 at least for removing documents of value from the outside is prevented. In contrast, in the open position persons can access the intermediate repository 16.

A locking device 92 that is electrically operable through locking signals, in the example an electromagnet which is held on the side wall 82 and interacts with a magnetizable element on the intermediate-area housing element 86, serves to lock the intermediate-area housing element 86 in the close position. For transmitting the signals the locking device 92 is connected to the control device 26 via a signal connection.

The intermediate repository 16 itself is mounted pivotally in the intermediate-area housing 56 in such a fashion that it can simply be removed from the intermediate-area housing 56 if the intermediate-area housing element 86 is in the open position.

Furthermore on the first opening 54 a trailing-edge sensor 94 is arranged for detecting the trailing edge of a document of value with reference to the transport direction into the intermediate repository 16 and emitting a corresponding trailing-edge detection signal to the control device 26. In this embodiment for this purpose the trailing-edge sensor 94 comprises a light barrier with a transmitter and a receiver. The transport path from the first opening 54 to the intermediate repository 16 lies in the detection range of the light barrier between the transmitter and the receiver. A detection circuit of the trailing-edge sensor 94 detects when the receiver is first re-illuminated by the transmitter after an unilluminated phase, as taking place during the passage of a document of value at its trailing edge, and then emits the trailing-edge detection signal.

The safe 22 for safely storing the security container 24 of a predetermined type has a closing element 96 that is movable back and forth between an open position and a close position and is linked via a hinge, in the example a door, through which, when it is disposed in its open position, security containers 24 can be inserted in the final storage area 20 or removed therefrom. However, in the close position, in the example in the figures a position in which the closing element 96 is disposed in the plane of projection, the safe 22 is closed by the exception of the openings 88 and 90 and is secured against access. An electrical safe locking device 98 connected to the control device 26 via a locking-signal connection serves to lock the closing element 96 in the close position, in the example an electrically controllable actuator and locking bolts that can be moved thereby, which can be operated through locking signals from the control device 26.

To ensure a suitable position of security containers in the safe 22 for transporting documents of value from the intermediate repository 16 into the security containers 82 the safe 22 has a positioning device 100 with guides for accommodating the security containers 24 in a predetermined position relative to the safe 22 and consequently to the openings 88 and 90. The positioning device 100 and the openings 88 and 90 are arranged and designed in adjustment with the security containers 24 in such a fashion that in the case that the security containers 24 are arranged in the positioning device 100 documents of value are transportable through the openings 88 and 90 into respectively one of the security containers 24. The apparatus can of course also be operated with only one security container.

The control device 26 serves to control the apparatus and for this purpose, in addition to interfaces to the individual components of the apparatus to be controlled and sensors, has a memory 102 in which among other things a computer program with instructions is stored, and a processor 104 which upon executing the instructions carries out the functions or method steps described in the following.

The control device 26 in connection with the switching element or interrupt 75 in these embodiments represents in particular also a position detection device for detecting a movement of the cover element 36 into the close position, more exactly the reaching of the close position. For this purpose signals from the interrupt 75 triggered by the movement of the cover element 36 out of the close position or into the close position are detected and in dependence on the signals detected a corresponding date is stored or deleted in the memory 102. The control device 26 is furthermore designed to control the actuating drive 78 in dependence on data in the position detection device, i.e. here the interrupt 75 in connection with the control device 26, in such a fashion that a transport between the intermediate repository 16 and the processing area 28 is possible or not.

In this example the control device 26 also comprises an access control device 106 schematically represented in FIG. 1 by a rectangle, which uses signals or data detected by the detection device 70 for access data and the data input and output device 72 to identify access authorizations for the processing area 28, the intermediate area 76 and the final storage area 20 or the safe 22.

In the access control device 106, more exactly a section of the memory 102, as first and second access data identification data for users are stored which are assigned uniquely to the respective users, and a code assigned to the first access data and access authorization data assigned to the first access data showing which areas of the apparatus are intended to be accessible for the user.

Each user of the apparatus has a chip card 108 for identifying his/her identity vis-à-vis the apparatus. The chip card 108 contains, preferably in an encrypted form, the first access data in the form of the identification data for the respective user.

In this embodiment three groups of operators are provided. The first group has access exclusively to the operation area 28, but not to the intermediate area 76 or the final storage area 20, the second group has access to both the processing area 28 and the intermediate area 76, but not to the final storage area 20, and the third group finally has access exclusively to the final storage area 20, but not to the processing area 28 or the intermediate area 76. Typical operators of the first group can for example be cashiers, who deposit money taken in at a cash desk for transport by a security transport company. Operators of the third group can for example be persons from the security transport company who remove the security containers 82 with the documents of value stored therein, here bank notes, from the safe 27 and transport them for example to a commercial bank or a so-called cash center. Persons of the second group can for example be particularly trustworthy persons who were trained in using the apparatus in such a fashion that they can carry out simple maintenance works on the apparatus, in particular eliminate a transport disturbance.

The apparatus works in the following manner.

First a registration of an operator with the apparatus takes place, during which also a check for the access authorization to the apparatus is checked.

For this purpose the access control device 106 carries out a check on the basis of access data whether predetermined access criteria are fulfilled. Here two criteria are checked. On the one hand it is checked whether the first access data, i.e. the identification data, correspond to stored identification data. On the other hand it is checked whether second access data of the operator correspond to the code assigned to the identification data. Only then is the operator allowed to use the apparatus and, depending on the operator, access is granted to different areas of the apparatus.

Thus an operator first inserts his chip card 108 in the detection device 70, which subsequently detects the access data on the chip card 108 and emits corresponding access signals to the access control device 106, in the example implemented by a corresponding part of the control device 26. As access criterion it is determined here whether the first access data are assigned to an authorized person. Furthermore, via the data input and output device 72, the access control device 106 requests a code assigned to the detected access data as second access data. The operator enters his code via the data input and output device 72 into the access control device 106, which compares the code detected by means of the data input and output device 72 with the second access data, i.e. the code, corresponding to the detected first access data. In the case that the data are consistent, a data set is assigned to the operator which contains among other things the date and the time and which in the further course of the operation is complemented by data on the operation. Furthermore it is determined corresponding to the data stored in the memory 102 which areas the operator can access, and corresponding data are temporarily stored.

Now the access control device 26 inquires via the data input and output device 72 which one of several possible operation modes the operator wishes to use. The control device then reads corresponding data entered by the operator via the data input and output device 72 and activates the apparatus to operate in the selected operation mode.

The first operation mode described in the following serves for depositing documents of value in the security containers 24 while the value of the documents of value, in the example bank notes, is detected simultaneously. The control device 26 permits this operation mode only for such operators who belong to the first or the second group.

The control device 26 subsequently checks whether the intermediate repository 16 is disposed in an input position with its input and output opening 80 in front of the first opening 54, so that bank notes can be transported through this opening into the intermediate repository 16. If this is not the case it activates the actuating drive 78 in such a fashion that the intermediate repository 16 with its input and output opening 80 is turned into the input position.

The operator places a stack of documents of value 12 into the input pocket 38. The control device 26 requests the start of the deposit via the data input and output device 72. Upon detecting a corresponding signal it activates the transport device 42 and the singler 40 in such a fashion that the bank notes 12 of the stack are fed in a singled state to the transport path, where they are guided by the transport device 42 along the transport path 48 firstly through the sensor device 50. It detects properties for each bank note in the way known in the art, generating corresponding signals. In this embodiment these are evaluated in an evaluation device implemented through the control device 26, in whose memory 102 corresponding instructions for the processor 104 are stored for this function.

On the basis of the signals of the sensor device 50 it is determined in a known fashion which denomination the checked bank note has, whether it is recognized as authentic according to at least one authenticity criterion, for example the absence of fluorescence during irradiation with UV radiation, and whether it is deemed fit for circulation.

In the case that upon checking for authenticity and fitness for circulation the control device 26 detects that the bank note is not authentic and/or not fit for circulation according to the checked criterion or is also oriented obliquely to the predetermined transport direction in the transport path, it activates the point switch 58 in such a fashion that the bank note is transported into the first output pocket 62 by the output transport device 60.

Otherwise it activates the point switch 58 in such a fashion that the bank note is transported through the first opening 54 into the intermediate repository 16, which is disposed in the input direction, and is stored there.

During the process the trailing-edge sensor 94 detects continuously whether an edge of a bank note that is a trailing edge with reference to the transport direction has passed its detection range and in this case emits a corresponding signal to the control device 26, which subsequently stores the position of the bank note in the sequence of the bank notes stored in the intermediate repository 16 and the value of the bank note according to the denomination.

During the deposit the singler 40 checks by means of a detection device whether there is another bank note to be drawn in. If this is no longer the case, it emits a signal to the control device 26. When the last bank note has been checked and transported either into the first output pocket 62 or into the intermediate repository 16, the control device 26 inquires via the data input and output device 72 whether further bank notes are to be deposited. If this is the case, the feeding is continued as described above. Otherwise, after receipt of the corresponding user signal from the data input and output device 72 the control device 26 moves, i.e. here turns, the intermediate repository 16 into one of two output positions which are indicated by dashed lines in FIG. 1. In the first or second output position the input and output opening 80 of the intermediate repository 16 is disposed in front of the second opening 88 or the further opening 90, so that a bank note transported out of the intermediate repository 16 can be transported through the second opening or the further opening 90 into the corresponding security container 82 without using a switch.

In the following three alternatives are described by way of example of how the control device 50 distributes the stored documents of value to the security containers 24, more exactly their pockets.

To explain a first alternative it is assumed in order to simplify the example that corresponding to the number of the security containers 24 only two denominations are input.

The control device 26, in which the storage sequence of the bank notes in the intermediate repository 16 is stored, in accordance with the FILO storage principle of the winding repository used here as intermediate repository 16 detects the next bank note to be output into one of the security containers 24 in the intermediate repository 16 and its denomination, and, by activating the actuating drive 78 corresponding to the detected denomination, moves the intermediate repository 16 into the first or second output position in which the bank note in question is output to the corresponding security container 24.

In a second alternative a maximum number of documents of value to be output into one of the security containers 24 are stored in the control device 50. The control device 50 activates the actuating drive 78 in such a fashion that at first documents of value are transported only through one of the openings 88 or 90 into the corresponding security container 24 and detects the number of the documents of value transported into this security container since the insertion of the then empty security containers 24 into the apparatus. It permanently carries out a comparison between the number of documents of value transported into the security container and the maximum number. Only upon recognizing that the maximum number was reached, it activates the actuating drive 78 in such a fashion that the intermediate repository 16 with its input and output opening 80 is turned in front of the recently unused opening, so that subsequently the other security container 24 can be filled with the documents of value stored in the intermediate repository 16. In this manner a security transport company has to be called less frequently to collect the documents of value, thereby increasing the availability of the apparatus.

In a third alternative the security containers 24 are respectively assigned to different organization, for example the security container 24 below the opening 88 to the organization A and the security container 24 below the opening 90 to the organization B. When the depositing person is identified the control device 26 detects through reading corresponding data identifying the organization or using a table in which a code for the respective organization is stored for each authorized user the organization for which the user deposits documents of value and activates the actuating drive 78 in such a fashion that the intermediate repository 16 with its input and output opening 80 above the opening 88 or 90 assigned to the security container for the corresponding organization and transports the documents of value from the intermediate repository 16 to the security container assigned to the respective organization. The apparatus can thus be commonly used by two completely different organizations, without the danger of an erroneous assignment of the deposited documents of value to the organizations. Such an apparatus is for example particularly suitable for use in shopping malls with a plurality of small shops which can use the apparatus together.

After emptying the intermediate repository 16 the value of the bank notes transported into the security containers 24 is determined and is stored including an assignment to the operator. The value can also be output via a printer not shown in the figures.

Due to the use of the two openings 88 and 90 to the safe 22 and the rotatability of the intermediate repository 16 no switches, which could lead to transport disturbances, are necessary or also provided in the final storage area 20.

The usual deposit procedure is concluded therewith.

In the case that the operator thinks that the detected value does not correspond to the assumed value, he can prompt the control device 26 to switch to a different operation mode by making a request via the data input and output device 72. There the control device 26 activates the actuating drive 78 in such a fashion that it turns the intermediate repository 16 with its input and output opening 80 in front of the output opening 64. The control device 26 then prompts the intermediate repository 16 to feed all documents of value contained therein through the output opening 64 to the stacker-wheel arrangement 66, by means of which the stored documents of value can be stacked in the second output pocket 68. The stored value and a credit entry that has possibly been made are then deleted.

As mentioned above in the normal deposit procedure disturbances can occur during transport, which are detected in a known fashion by the control device 26 on the basis of signals from corresponding sensors along the transport path, for example light barriers, which are not shown in the figures. When the intermediate repository 16 is filled, i.e. during transport from the input pocket 38 along the transport path 48 disturbances can occur in the area of the singler 40, the sensor device 50 and the point switch 58. The sensors are arranged in such positions where the greatest disturbance risk is given, for example downstream of the singler, upstream of the point switch 58 and upstream of the first opening 54.

In the case that the control device 26 detects a disturbance, it switches to a further operation mode and, via the data input and output device 72, outputs an indication that a disturbance has occurred and the location of the disturbance in a schematic representation of the transport path, as well as a request for the elimination of the disturbance. At the same time the control device 26 actuates the locking device 74, so that the latter allows a movement of the cover element 36 to the open position. In this embodiment for this purpose the drive is activated in such a fashion that the cover element 36 is unlocked by the locking device 74, so that it can be moved to the open position, the operator gains access to the processing area 28 and can eliminate the disturbance.

Upon detecting the open command the control device 26 as position detection device stores a corresponding date in its memory 102. When this date is given, it activates the actuating drive 78 in such a manner that the intermediate repository 16 is turned into a protective position, in which the input and output opening 80 is not arranged in front of one of the openings in the intermediate-area housing 56 and it is consequently impossible to access the intermediate repository 16 from the processing area 28 through the first opening 54 or the output opening 64.

Upon reaching the open position the control device 26 requests the closing of the cover element 36 via the data input and output device 72. Simultaneously it monitors the position detection device, more exactly the interrupt 75, as to whether the cover element 36 is disposed in the close position. After the cover element 36 was moved to the close position and hence the interrupt 75 was operated emitting a corresponding signal, the control device 50 receives the signal and after evaluating the signal activates the first locking device 74 in such a fashion that the cover element 36 is locked in the close position. Furthermore it deletes the date from the memory 102 and activates the actuating drive 78 in such a fashion that it turns the intermediate repository 16 to an input position in which bank notes can be transported from the processing area 28 through the first opening 54 into the intermediate repository.

Afterwards the control device 26 automatically continues the processing of the bank notes.

Furthermore disturbances can occur in the intermediate area 76. When such a disturbance is detected by the control device 26 it switches to a further operation mode and stops the transport device 42, so that no further documents of value are transported into the intermediate area 76. Since for eliminating a disturbance it is necessary to move the intermediate-area housing element 86 to the open position and the intermediate repository 16 is consequently accessible, the control device stores the detected data about the documents of value stored in the intermediate repository 16 and displays the location of the disturbance on the data input and output device 72.

Now a person belonging to the third group can register in the manner corresponding to the operator. After registration he can instruct the control device 26 by means of a corresponding entry in the data input and output device 72 to operate the locking device 92, so that the intermediate-area housing element 86 can be moved to the open position. Now access can be gained to the complete intermediate area 76 and the person can remove a document of value causing the disturbance and/or replace the intermediate repository 16.

After eliminating the disturbance the person can move the intermediate-area housing element 86 to the close position and prompt the control device 26 by operating the data input and output device 72 to lock the intermediate-area housing element 86 in the close position by means of the locking device 92.

After eliminating the disturbance the apparatus can be further operated in a normal manner.

For removing the security containers 24 a person of the second group can register with the apparatus analogously to the above-mentioned persons, which checks the access authorization as above and switches to a further operation mode.

The control device 26 inquires via the data input and output device 72 whether the closing element 96 of the safe 22 is to be moved in its open position. Upon a corresponding entry the control device 26 activates the locking device 98 in such a fashion that the closing element 96 which was locked before by the locking device 98 is unlocked and can be moved to the open position. In this state a movement of the cover element 36 or of the intermediate-area housing element 86 out of the respective close position is impossible due to the corresponding locking devices.

Furthermore the control device activates the actuating drive 78 in such a fashion that it turns the intermediate repository 16 to the above-mentioned security position, so that it is impossible to access the intermediate repository 16 from the final storage area 20 via the openings 88 and 90.

After removing the security containers 24 and moving the closing element 96 to its close position the operator can respond to an inquiry by the control device 26 made via the data input and output device 72 whether the closing element 96 is to be locked by making an entry, upon which the control device 26 activates the locking device 98 in such a manner that the closing element 96 is locked in its close position.

Figure 4:
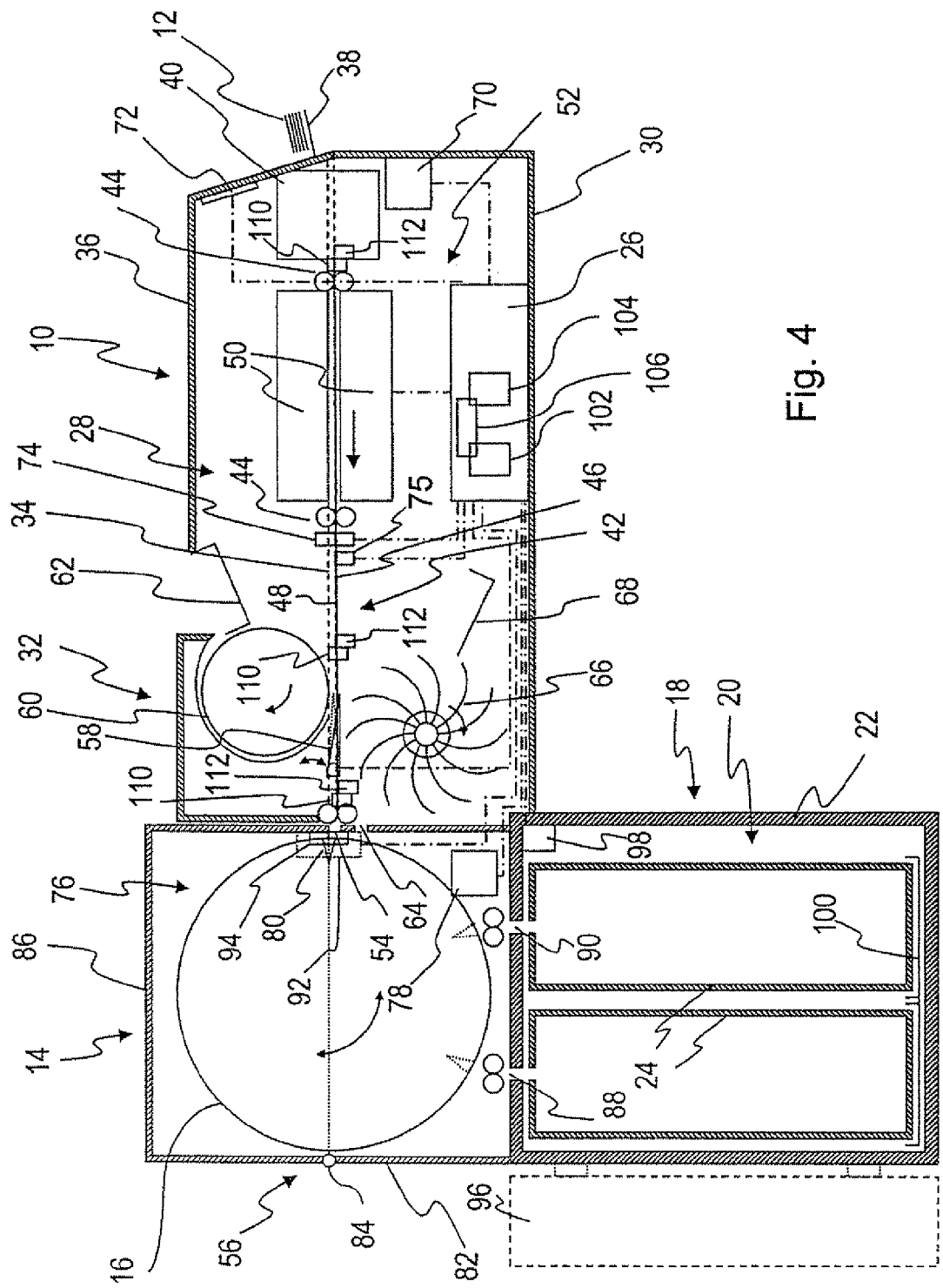

Another preferred embodiment in FIG. 4 differs from the first embodiment only in that along the transport path in the locations in which sensors 110, for example light barriers, are arranged for detecting transport disturbances, signal devices 112, in this example light emitting diodes, are provided which are activated by the control device 26 when a disturbance was detected in the respective location. Merely for the sake of clarity in FIG. 4 some of the reference numerals in FIG. 1 designating unchanged elements have been left out. Also for the sake of clarity in FIG. 4 only some of the signal devices 112 are represented. Signal devices 112 are i.e. disposed upstream and downstream of the singler 40, on the point switch 58, upstream of the first opening 54 and the rollers 44, on the first output pocket 62, on the stacker wheel arrangement 66 and on the second output pocket 68. For detecting the location of a disturbance the control device 26 monitors corresponding signals from the sensors 110 and upon detecting a disturbance on the basis of the signals activates the signal device 112 arranged in the location of the sensor detecting the disturbance. In this way also an inexperienced operator can easily find the location of the disturbance and eliminate it quickly. In parallel the location of the disturbance can also be displayed on the data input and output device 72.

Further preferred embodiments can differ from the above-described embodiments in that the detection device, i.e. the chip card reader, is replaced by a fingerprint sensor, a microphone or a camera and for evaluating the data the control device 26 has corresponding instructions of a computer program, in the execution of which by the control device 26 the detected signals from the detection device are used for recognizing a fingerprint or for recognizing a voice or for recognizing the retina background.

Furthermore, if a chip card writing and reading device is used instead of the chip card reader, the value of the deposited documents of value or bank notes can be written on the inserted chip card and stored there.

Figure 5:
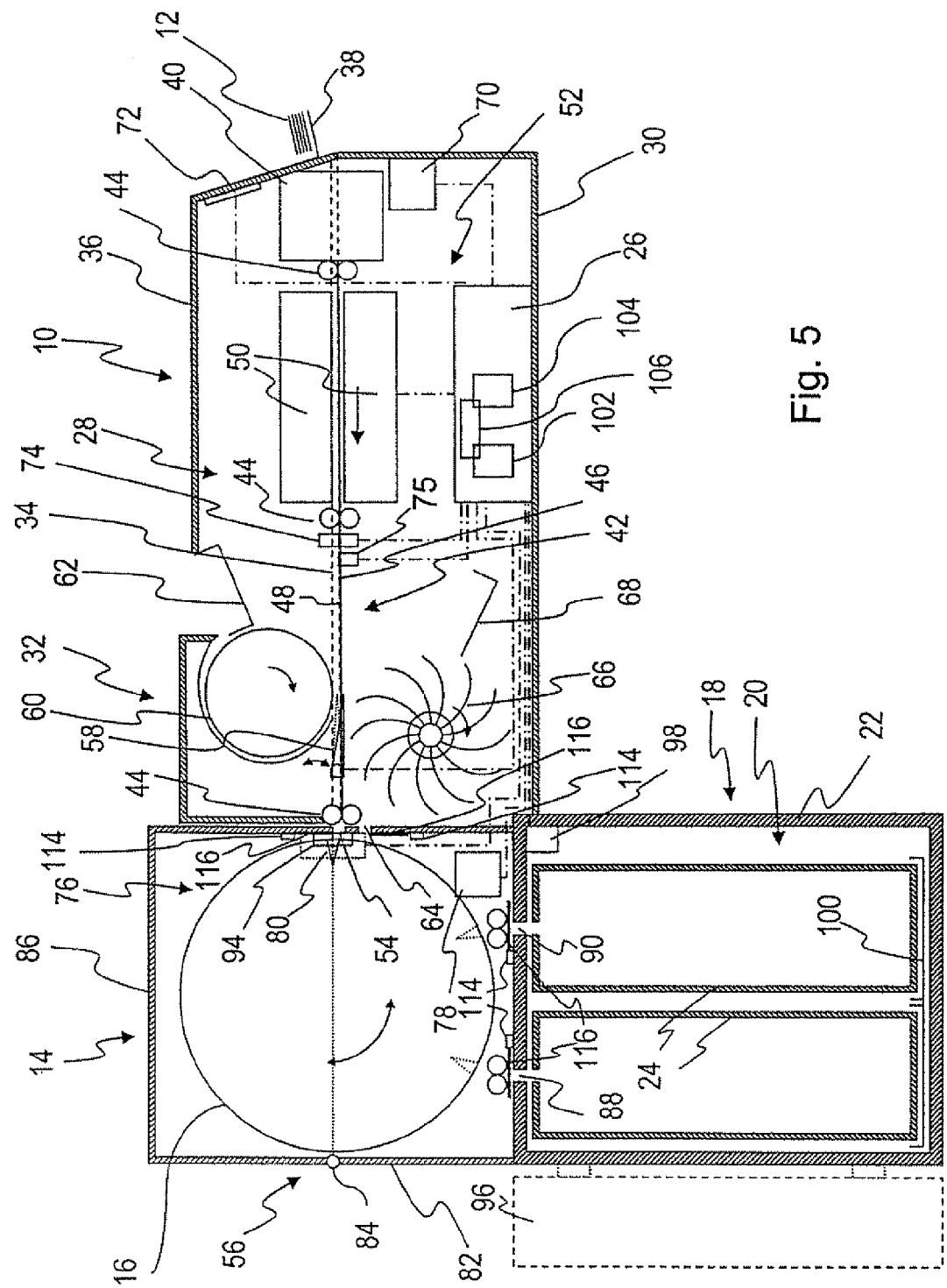

A further preferred embodiment differs from the first embodiment only in that in front of the openings in the intermediate-area housing 56 closing elements 116 of the intermediate housing 56 are arranged, which are movable via actuating drives 114 and which are arranged on the intermediate housing 56, closing the opening in a close position and releasing them in an open position in the different operation modes. This is illustrated in FIG. 5, where some of the reference numerals in FIG. 1 designating unchanged elements have been left out merely for the sake of clarity.

The control device 26 is modified in such a fashion that for closing or opening the openings in the intermediate-area housing 56 it does not activate the actuating drive 98 for the intermediate repository 16, but at least one of the actuating drives 114.

Yet another preferred embodiment differs from the first embodiment in that for detecting the position of the cover element 36 in the control device 26 a corresponding state date is set upon executing an opening or closing command, so that the control device 25 already serves as position detection device in this case. The drive is preferably designed in such a way that it serves as locking device simultaneously.

The apparatus can also be operated with only one security container, for which purpose the movement of the intermediate repository 16 is controlled correspondingly.

Figure 6A:
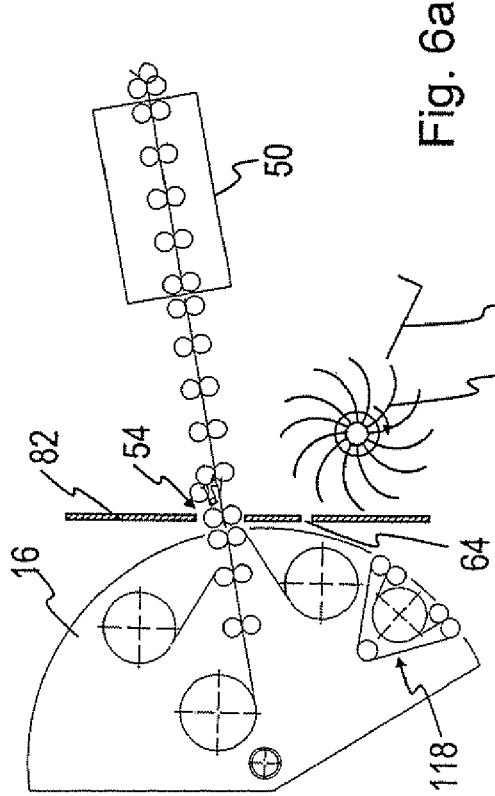
Figure 6B:
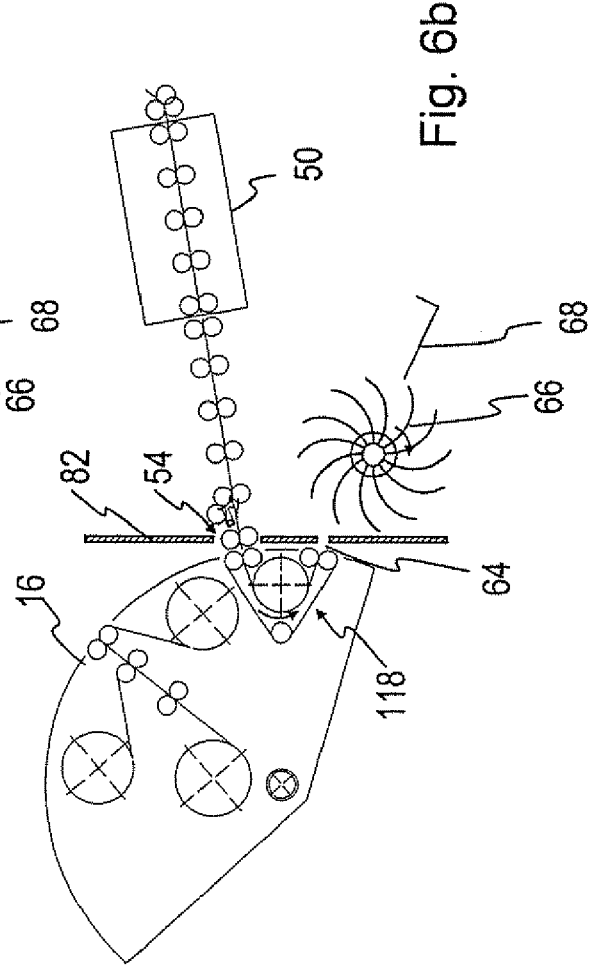

A further embodiment partly shown in FIGS. 6a and 6b differs from the first embodiment in that a diverter 118 for diverting documents of value is statically mounted on the intermediate repository 16 and can be turned or swiveled with it, that the distance between the first opening 54 and the output opening 64 and the input and output rollers of the diverter 118 are adjusted to each other, so that documents of value, in the example bank notes, as shown in FIG. 6b, can be transported through the first opening 54 into the diverter 118, diverted by it and output through the output opening 64 via the stacker wheel arrangement 66 into the second output pocket 68. Furthermore the transport device is designed as a pure roller transport device. Finally the control device 26 differs from the control device of the first embodiment in that for operation in a counting mode it is now designed to move the intermediate repository 16 through activating the drive 78 in such a fashion that documents of value can be transported through the first opening 454 into the diverter 118 and from there to the output opening 64, and to determine the value of the documents of value output through the output opening 64 in this mode and to output it via the data input and output device 72. All other components are unchanged, so that also for these the same reference numerals were used as in the first embodiment and the explanations made there are correspondingly valid here.

By inputting corresponding commands via the data input and output device 72 a user can switch the control device 26 to a deposit mode, in which the apparatus works as described in the first embodiment, or to the counting mode.

In the case that the counting mode is selected the control device 26 by activating the drive 78 turns the intermediate repository 16 and consequently the diverter 118 to a diverting position, in which bank notes are transported through the first opening 54 into the diverter 118 and are diverted by it to the output opening 64, from where they are stacked via the stacker wheel arrangement 66 in the second output pocket 68. The user now places a stack of bank notes in the input pocket 38, from where they are transported past the sensor device 50 for checking and, if the check is successful, transported along the described path into the second output pocket 68. During the check the denominations of the bank notes are determined and summed up in the control device 26. After processing the last bank note of the stack the control device 26 outputs the determined total value via the data input and output device 72.

However, if the user selects the normal deposit mode, the control device 26 turns the intermediate repository 16 into the storage position shown in FIG. 6a, in which bank notes can be transported through the first opening 54 into the input and output opening 80 of the intermediate repository 16, and carries out the procedure described in connection with the first embodiment.

Therefore the apparatus cannot only be used for depositing documents of value or bank notes, but also for counting bank notes.

In a further different embodiment the transport path provided by the transport device can have a branch along which documents of value can be transported to the final storage device, i.e. the safe 22 or the security containers 24 therein, without intermediate storage in the intermediate repository 16. For this purpose in the transport path downstream of the point switch 58 a further switch is arranged that is controllable by the control device 26, by means of which transport via the additional branch can take place selectively.

Figure 7:
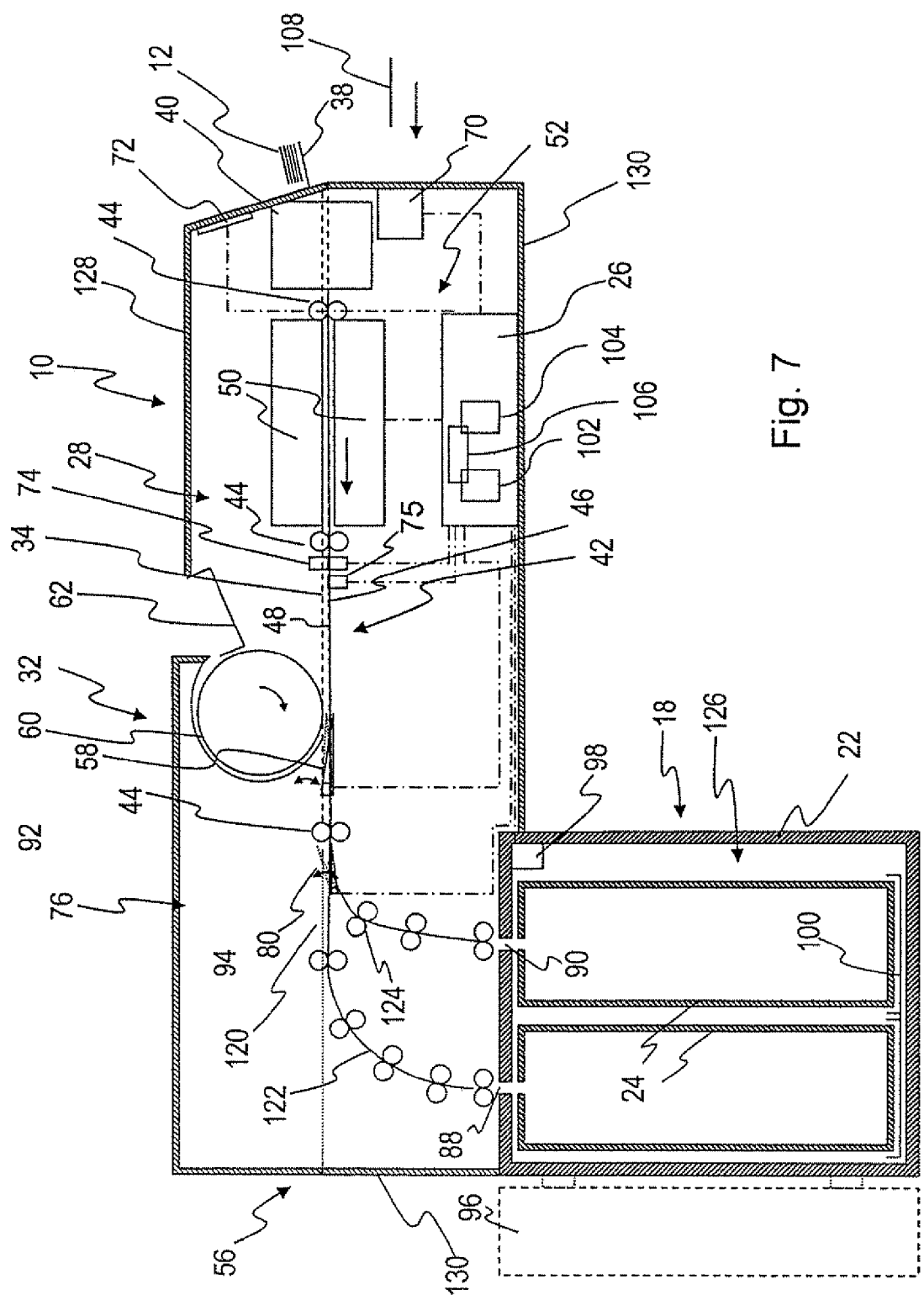

A further embodiment in FIG. 7 differs from the first embodiment in that the intermediate storage area including the intermediate repository and the intermediate-area housing is omitted, so that after checking documents of value can be transported in dependence on the checking result to the storage area 126, which otherwise corresponds to the final storage area 20 in the first embodiment and is unchanged in comparison thereto. In particular the storage-area housing now represents the final storage device or the safe 22. The first opening in the sense of the claims now is the opening 88. The movable cover element 128 now extends over the surface of the complete housing base portion 130 which now extends beyond the storage area 126 but otherwise has the features of the first embodiment, however otherwise it has the same features as the cover element of the first embodiment, Instead of the intermediate repository 26 downstream of the transport path or the opening 54 downstream of the switch 58 a diverter is arranged which has a switch 120 that is connected to the control device 36 via a signal connection and can be activated by it through switch signals and two further transport devices 122 and 124 in the form of curved sections leading from the switch 120 to the openings 88 and 90 from the intermediate area 76 to the safe 22. The transport path in the sense of the invention now extends from the singler 40 to the opening 80. The diverter and the following transport device 124 determine a further branch of the transport path which preferably does not extend in a folded manner up to the opening 90 and is accessible for an operator for eliminating transport disturbances along the complete branch, if the cover element 128 is disposed in the open position. The output opening 64, the stacker wheel arrangement 66 and the second output 68 are omitted. The control device is now designed to activate the switch 120. All other components are unchanged, so that the same reference numerals are used for them and the explanations made concerning the first embodiment are also valid here. In dependence on the authentication of the depositing person or the filling degree of the security container 24 the control device 26 now activates the diverter, more exactly the switch 120, in the example a point switch, in such a fashion that documents of value or bank notes fed to it are fed by one of the further transport devices 122 or 124 through the corresponding opening 88 or 90 into the storage area 126 or the corresponding security containers 24 therein.

In all described embodiments and also in general the apparatus can be designed in such a fashion that the documents of value are transported with the direction of their largest extension parallel to the transport direction (lengthwise transport), however, preferably the transport takes place in the transverse direction, wherein the documents of value are transported with the direction of their largest extension or lengthwise direction transverse to the transport direction.

The invention claimed is:

1. An apparatus for processing documents of value comprising a checking device arranged to check documents of value for at least one property of a document of value according to at least an authenticity criterion, having a sensor device arranged in a processing area enclosed by a processing-area housing for detecting the property;
   a storage-area housing enclosing and securing against unauthorized access a storage area in which documents of value recognized by the checking device as authentic according to the criterion are to be stored and which has a first opening through which the documents of value are transportable out of the processing area into the storage area;
   a transport device arranged in the processing area to transport in a singled state documents of value fed along a transport path from an input device for inputting documents of value in a singled state or a singler to the checking device and from the checking device to the storage area;
   a processing-area cover, which is part of the processing-area housing, having a cover element which is movable back and forth between a closed position at which the processing area is covered by the processing-area cover and an open position at which access to the transport path from the input device or the singler to the checking device and from the checking device to the storage area is enabled; and
   a closing device with a drive that can be activated by closing signals, which, upon the activation of the drive by a closing signal, moves the cover element from a release position lying between the open position and the closed position into the closed position.

2. The apparatus according to claim 1, in which the processing-area cover has only one movable cover element.

3. The apparatus according to claim 2, in which the cover element serves as a carrier for parts of the checking device and/or the transport device.

4. The apparatus according to claim 1, in which the cover element is arranged to be turned or swiveled around an axis substantially parallel to a plane defined by the transport path.

5. The apparatus according to claim 1, in which the transport path from the input device or the singler to the storage area extends in an unfolded fashion.

6. The apparatus according to claim 1, in which the transport path extends in a substantially straight line.

7. The apparatus according to claim 1, including a control device arranged to detect and store at least one property of documents of value transported into the storage area which was recognized during the check by the checking device.

8. The apparatus according to claim 7, in which the control device is arranged to detect an end of the transport of documents of value into the storage area, and upon detecting such end to determine a cumulative property of the documents of value stored in the storage area.

9. The apparatus according to claim 1, including a signal device arranged to display the location along the transport path to the storage area in which the occurrence of a transport error was detected.

10. The apparatus according to claim 1, in which the first opening has the shape of a slot with a width of less than 9 mm.

11. The apparatus according to claim 1, in which the storage-area housing has a storage-area housing element which is movable back and forth between an open position, in which an operator is enabled to access the storage area via an access area, and a closed position, in which the storage-area housing element protects the storage area against access by an operator via the access area at least for removing documents of value; and a locking device arranged to lock the storage-area housing element in the closed position.

12. The apparatus according to claim 11, in which the locking device is electrically and/or pneumatically and/or hydraulically controllable.

13. The apparatus according to claim 1, including at least one access-data detection device arranged to detect access data and at least one access control device connected with the access-data detection device via a signal connection that enables checking of detected access data for the fulfillment of at least one predetermined access criterion and controlling a locking device in dependence on the check.

14. The apparatus according to claim 13, in which the access-data detection device comprises a reading device arranged to read access data from a mobile data carrier or data memory.

15. The apparatus according to claim 13, in which the access data comprise biometric data of an operator and the access-data detection device comprises a device capable of detecting the biometric data.

16. The apparatus according to claim 1, in which at least one element in the storage-area housing or the processing area and/or one element of the storage-area housing is movable relative to the processing area between a first position, at which documents of value are transportable through the first opening between the storage area and the processing area, and a second position, at which at least, in the case that the cover element is disposed in the open position and the storage-area housing element is disposed in the closed position, transportation of a document of value out of the storage area through the first opening to the processing area is prevented.

17. The apparatus according to claim 1, in which the storage-area housing comprises a final storage device arranged to accommodate at least one security container capable of storing documents of value, which container encloses the storage area at least partially and includes the first opening.

18. The apparatus according to claim 17, in which at least, in the case that the cover element is disposed in the open position, the first opening is closed to such an extent that transportation of a document of value through the first opening is prevented.

19. The apparatus according to claim 1, in which in an intermediate-area housing at least one further opening to the storage area is arranged, so that through the openings to the storage area documents of value are transportable into at least two pockets of a predetermined security container having at least two pockets or into at least two predetermined security containers in the storage area.

20. An apparatus for processing documents of value comprising:
 a checking device arranged to check documents of value for at least one property of a document of value according to at least an authenticity criterion using a sensor device arranged in a processing area for detecting the property;
 a storage-area housing enclosing and securing against unauthorized access a storage area in which documents of value recognized by the checking device as authentic according to the criterion are to be stored and which has a first opening through which the documents of value are transportable out of the processing area into the storage area
 a transport device arranged in the processing area to transport in a singled state documents of value fed along a transport path from an input device for inputting documents of value in a singled state or a singler to the checking device and from the checking device to the storage area;
 a processing-area cover having a cover element which is movable back and forth between a closed position at which the processing area is covered by the processing-area cover and an open position at which access to the transport path from the input device or the singler to the checking device and from the checking device to the storage area is enabled; and
 a signal device arranged to display the location along the transport path to the storage area in which the occurrence of a transport error was detected;
 wherein the signal device has at least two light sources arranged along the transport path; and in which the control device is arranged and connected to the signal device in such a fashion that, upon detecting the location of a disturbance, the light source which is closest to the location of the disturbance is switched to a different operating state.

21. An apparatus for processing documents of value comprising:
 a checking device arranged to check documents of value for at least one property of a document of value according to at least an authenticity criterion using a sensor device arranged in a processing area for detecting the property;
 a storage-area housing enclosing and securing against unauthorized access a storage area in which documents of value recognized by the checking device as authentic according to the criterion are to be stored and which has a first opening through which the documents of value are transportable out of the processing area into the storage area;
 a transport device arranged in the processing area to transport in a singled state documents of value fed along a transport path from an input device for inputting documents of value in a singled state or a singler to the checking device and from the checking device to the storage area; and
 a processing-area cover having a cover element which is movable back and forth between a closed position at which the processing area is covered by the processing-area cover and an open position at which access to the transport path from the input device or the singler to the checking device and from the checking device to the storage area is enabled;

an intermediate repository arranged in the storage area representing an intermediate area arranged to intermediately store at least documents of value whose property fulfills the criterion in a check by the checking device, and a final storage device at least partially enclosing a final storage area arranged to accommodate at least one security container adapted to store documents of value received from the intermediate repository;

wherein the storage-area housing represents an intermediate-area housing enclosing the intermediate area comprising the first opening through which documents of value coming from the checking device are fed to the intermediate repository, and a second opening through which documents of value are transportable out of the intermediate repository into the final storage area; and wherein the storage-area housing element represents an intermediate-area housing element which is movable back and forth between an open position, at which an operator is enabled to access the intermediate repository via an access area, and a closed position, at which the intermediate-area housing element protects the intermediate area against access by an operator via the access area at least for removing documents of value; and wherein the apparatus is configured so that the intermediate repository is protected against access by an operator at least for removing a document of value stored therein through the first opening when the intermediate-area housing element is disposed in the closed position.

22. The apparatus according to claim 21, in which the second opening has the shape of a slot with a width of less than 9 mm.

23. The apparatus according to claim 21, in which at least in the case that the cover element is disposed in the open position and the intermediate-area housing element is disposed in the closed position, the first opening is closed to such an extent that transportation of a document of value through the first opening is prevented.

24. The apparatus according to claim 21, in which the intermediate repository is movable relative to the processing area between a first position, at which documents of value are transportable through the first opening between the intermediate repository and the processing area, and a second position, at which at least in the case that the cover element is disposed in the open position and the intermediate-area housing element is disposed in the closed position, a transport of a document of value out of the intermediate repository through the first opening to the processing area is prevented.

25. The apparatus according to claim 24, comprising at least one actuating drive arranged to move the intermediate repository and a position-detection device arranged to detect a movement of the cover element to the open position and/or reaching the open position, and wherein the control device is designed so as to activate, in dependence on signals of the position detection device and/or data in the position detection device for detecting a movement, the actuating drive in such a fashion that a transport between the intermediate repository and the processing area is enabled or not.

26. The apparatus according to claim 21, in which at least one further element in the intermediate-area housing, a further element of the intermediate-area housing and/or the intermediate repository is movable back and forth relative to the final storage area between a first position, at which documents of value are transportable through the second opening out of the intermediate repository into the final storage area, and a second position, at which such movement is not enabled.

27. The apparatus according to claim 26, wherein, for outputting documents of value, an actuating drive arranged to move the further element in the intermediate-area housing and/or the intermediate-area housing and/or the intermediate repository is provided; and wherein the control device is arranged to activate the actuating drive in such a fashion that documents of value stored in the intermediate repository are transportable through one of the openings to the final storage area in dependence on the filling level in the security container and/or in dependence on data input in the control device and/or corresponding to their stored property.

28. The apparatus according to claim 21, in which in the intermediate-area housing at least one further opening to the final storage area is arranged, so that through the openings to the final storage area documents of value are transportable into at least two pockets of a predetermined security container having at least two pockets or into at least two predetermined security containers in the final storage area.

29. The apparatus according to claim 21, in which the intermediate repository is removable from the apparatus if the intermediate-area housing element is disposed in the open position.

* * * * *